Aug. 29, 1939.                R. STRAUBEL                2,170,979
                    OPTICAL SYSTEM FOR SEARCHLIGHTS
                         Filed Sept. 8, 1937

Inventor:
Rudolf Straubel

Patented Aug. 29, 1939

2,170,979

UNITED STATES PATENT OFFICE 2,170,979

OPTICAL SYSTEM FOR SEARCHLIGHTS

Rudolf Straubel, Jena, Germany

Application September 8, 1937, Serial No. 162,905
In Germany September 12, 1936

5 Claims. (Cl. 240—41.3)

An application has been filed in Germany September 12, 1936.

The present invention relates to an optical system for search-lights which consists of a thin lens-mirror and a lens and in which nearly the entire or all the convergence is produced by this mirror, whose optical surfaces are nearly or completely spherical, the spherical aberration of the rays emanating from the axial point of the luminous surface being corrected in the system.

The invention provides that the said lens is near the centres of vertex curvature of the surfaces of the lens-mirror, and that the distance apart of the light source and the centre of curvature of the front surface of the lens-mirror is greater, the product of this distance and $$\cos \frac{U}{2}$$

however, smaller, than half the radius of curvature of the front surface of the lens-mirror, $U$ designating the angle of aperture. This arrangement offers the advantage that also errors in the magnification of the system are neutralized considerably even when the said lens is thin. The system is, accordingly, very suitable for high-power search-lights, viz. for search-lights which have mirrors of 60 centimetres in diameter and more. In search-lights of this kind, the optical system has generally been a parabolic reflector in the form of a surface reflector or in that of a lens-mirror. The parabolic type has, however, the disadvantage that its surface elements project light-source images of different sizes and shapes, so that the image of a uniformly luminous surface has a brightness which decreases towards the margin gradually. It is possible, however, to obtain a luminous field whose decrease in brightness takes place abruptly at the margin if the errors in the magnification of the optical system are neutralized to a considerable extent. The magnification of a system producing an image at a considerable distance is defined by the ratio of the image angle of a diameter of the luminous surface to this diameter, the image angle being the angle at which the said diameter appears to an eye at the system. The reciprocal magnitude of this ratio is termed hereinafter the focal distance.

Figure 1:
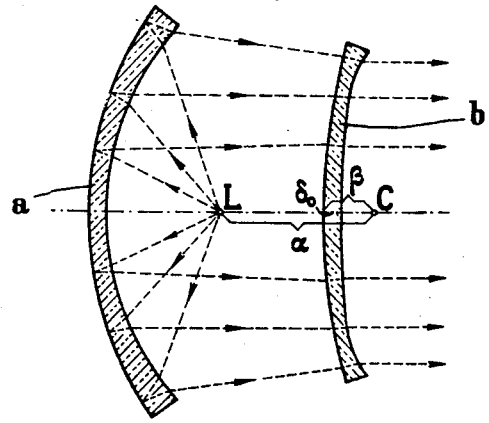
Figure 2:
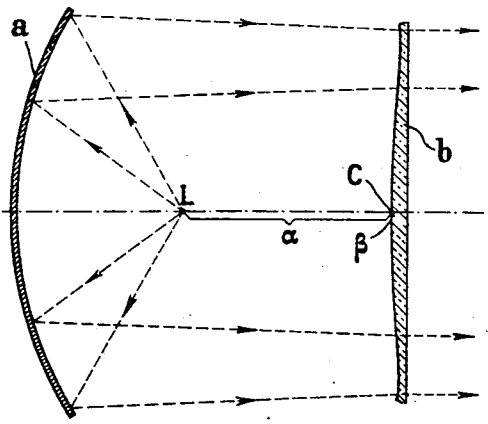
Figure 3:
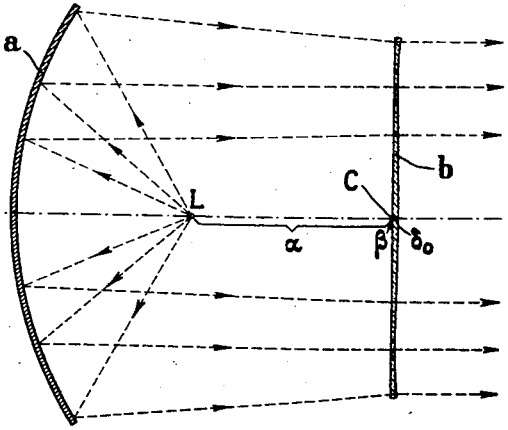
Figure 4:
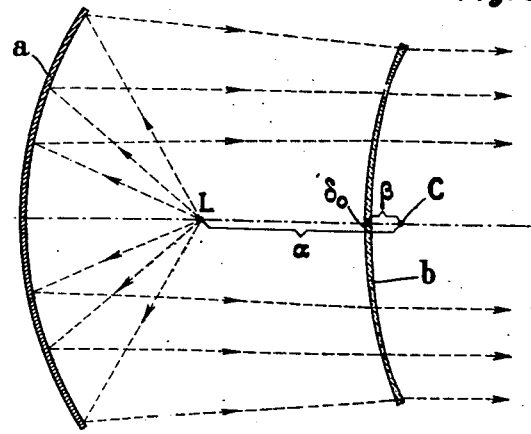

In the accompanying drawing, Figure 1 illustrates a schematical optical system according to the invention and Figures 2 to 4 show sections through the axes of three constructional examples.

In Figure 1, $a$ is a lens-mirror and $b$ the lens of the system. A light-source L is disposed between these two elements. The centre of vertex curvature of the front surface of the lens-mirror $a$ is designated C and the thickness at the vertex of the lens $b$ is designated $r_0$. $\alpha$ is the distance of the light-source L from the centre of curvature C and $\beta$ the distance of this centre C from that vertex of the lens $b$ which is near the lens-mirror $a$. The unit for $\alpha, \beta$ and $r_0$ as well as all other distances is the radius of vertex curvature of the front surface of the mirror $a$. If, as is shown in the drawing, the centre of curvature C lies to the right of the said vertex, the distance $\beta$ is to be considered in calculation as positive. This distance is to be considered as negative when the point C is to the left of the vertex.

The spherical aberration of the system consisting of the lens-mirror $a$ and the lens $b$ can be removed by giving the lens $b$ a suitable form. As regards magnification and its errors, a difference is to be made between sagittal and meridional pencils. All magnifications can be the same when the two surfaces of the lens $b$ are of suitable form and the lens assumes a suitable position. In most cases, however, a search-light system does not require this ideal condition to be fulfilled, it being sufficient to reduce the errors of magnification to small quantities negligible in practice. As the magnification of the meridional pencils is subject to the greater variations, the lens may assume, for instance, such a position and have such a form that the meridional magnification is the same in the margin and at the axis or that the meridional and the sagittal magnification are the same in the margin. In most cases, however, this condition can be replaced by equality of the sagittal magnifications in two zones, for instance centre and margin.

The thickness of the lens-mirror $a$ is to be slight in all zones. If the disadvantages inherent in mere surface reflectors, namely small reflecting power and less resistance to chemical attacks, can be disregarded, the said thickness may even be zero. A thin lens-mirror $a$ offers the advantage of economy of material and, what is especially useful for portable search-lights, reduction in weight, a further advantage being reduction of the sensitivity to differences in temperature.

The following description of lens forms is simplified by assuming the lens-mirror to be a spherical surface mirror. The form of the lens is decided by the ratio at which the light source divides the axial line connecting the vertex and the centre of curvature of the mirror. It has been found out that the lens thickness increases from the centre to the margin when $\alpha = 0.5$ and decreases from the centre to the margin when $$\alpha = \frac{1}{2 \cos \frac{U}{2}}$$

If $\alpha$ is between 0.5 and $$\frac{1}{2 \cos \frac{U}{2}}$$

the lens has a zone of slightest thickness, which is displaced from the centre to the margin according as 0.5 is being changed to $$\frac{1}{2 \cos \frac{U}{2}}$$

Accordingly, the central thickness increases and the marginal thickness decreases, and there exists a form in which the central and the marginal thickness of the lens are equal. This form is, at least very nearly, the form having the slightest differences between the greatest and the smallest thickness.

Aside from the lens having the slightest difference in thickness is a form offering advantages of a different kind. The angle which the lens surfaces include in any zone and which decides upon the deflection of the rays in this zone has a maximum in any lens form having a zone of slightest thickness, this maximum lying between the zone of slightest thickness and the centre. In the remaining places, the angle between the lens surfaces is greatest in the margin. As the deflection of rays is approximately proportional to the said angle, and as the chromatic error is approximately proportional to this deflection, the chromatic differences can be reduced when the greatest angle of the surfaces is reduced to a minimum in the two decisive zones. This reduction is obtained when the angles at the two zones are the same. $\alpha$ is to have, accordingly, a magnitude which lies between that of the lens having the slightest difference in thickness and $$\frac{1}{2 \cos \frac{U}{2}}$$

and corresponds, for instance when $U=60°$, to the mean magnitude. The chromatic errors can be reduced for $U=60°$ with respect to the lens $\alpha=0.5$ to less than ⅓, with respect to the lens of the slightest difference in thickness to less than ½, and with respect to the lens $$\alpha = \frac{1}{2 \cos \frac{U}{2}}$$

to less than ⅔.

As in lenses having the slightest chromatic errors—and in all lenses having a minimum thickness—the sequence of colors from the two areas separated by the zone of slightest thickness are reverse to each other, the short-wave colors of the one range lie over the long-wave colors of the other and vice versa, the consequence being a reduction of the chromatic errors, which are very slight in themselves.

The following description refers to a lens having a plane surface remote from the concave mirror. As the axial thickness of the lens does obviously not produce any influence in this case, there exists for the equality of the sagittal magnifications at the centre and in the margin a simple relation between $\alpha$, $\beta$ and the angle of aperture $U$, this relation being sufficiently defined for $U=60°$ by the following figures:

I  $\alpha=0.5000$  $\beta=-0.0576$
   $\alpha=0.5326$  $\beta=-0.0125$
   $\alpha=0.5568$  $\beta=+0.0032$
   $\alpha=0.5774$  $\beta=\phantom{+}0.0000$ If $\alpha$ is between 0.5326 and 0.5568, $\beta$ may again become zero, corresponding to $\alpha=0.549$. $\beta$ has a positive maximum when $\alpha$ lies between 0.549 and 0.5774.

The relation $(\alpha, \beta)$ is less simple when the lens has a plane surface facing the concave mirror, since the axial thickness $\varkappa$ produces a certain influence which, in its turn, is determined by the demands made upon sufficient thickness at the locus of smallest thickness. If 0.0075 is the minimum thickness, referring to the radius of curvature of the mirror, the following figures are obtained:

II  $\alpha=0.5000$  $\beta=-0.0119$  $\varkappa=0.0075$
    $\alpha=0.5326$  $\beta=-0.0026$  $\varkappa=0.0151$
    $\alpha=0.5774$  $\beta=+0.0306$  $\varkappa=0.0470$ The first and last examples of the Tables I and II do not form part of the invention and are stated only for the sake of a better understanding.

It is easy to deduce from the flat forms described above the curved forms rather exactly by bending the lens, the thickness or the paths of the light having to remain. As is well known, the locus of the lens is determined in the simplest manner by calculating two loci and interpolating to equality of the sagittal focal lengths.

To give an example as to the quality of the correction, reference is now had to the second example in Table II, the magnitudes being calculated to one figure more:

$\alpha=0.53257$  $\beta=-0.00260$  $\varkappa=0.01508$

Respecting the sagittal focal lengths, 0.53338 is obtained for the axis and $U=60°$, and 0.53257 for an angle of 40°.28, the relative difference being only $15.10^{-4}$. As the sagittal focal lengths have similar slight differences also with respect to the remaining zones, also the meridional and all other focal lengths are sufficiently equal for ensuring for an illumination system a sufficiently sharp image of a small luminous surface at right angles to the axis.

Surfaces with points of inflection are more difficult to make and examine than surfaces devoid of such points. To do away with points of inflection, the lenses are therefore conveniently bent to the shape of menisci until these points disappear. When the lenses are being bent, the point of inflection travels either to the margin or to the centre and disappears at these places when the bending assumes a certain magnitude. Whether the bending is effected in the one sense or the other depends on what importance is attached to the magnitude of the bending and also on which bending sense provides the smaller deviations of the magnification.

The lens-mirror is especially improved by providing that its surfaces cause rays to coincide. A ray optically influenced by a lens-mirror $n$ times may be called a ray of the $n^{th}$ order. Accordingly, a ray reflected on the front surface of the lens-mirror is of the first order, a ray which has traversed the front surface and, after reflection on the back surface, retraversed the front surface is of the third order, a ray reflected three times in the interior and refracted twice by the front surface is of the fifth order, and so on. On the strength of this classification, the following can be said: The lens-mirror is to have surfaces causing in at least one zone the coincidence of a ray of the first or the fifth order with a ray of the third order. This improvement can be increased, however, by so constructing the surfaces of the lens-mirror that the rays of the first or fifth order coincide with those of the third order not only in one zone but in all zones from the centre to the margin, in which case the rays of all orders coincide, no disturbing secondary images being produced and all rays being utilized for illumination without any exception. This utilization of all the rays is independent from the form the one of the surfaces of the lens-mirror is given and can always be arrived at by suitably shaping the other surface. Accordingly, there can be spherical either the front or the back surface of the lens-mirror.

The constructional examples illustrated by Figures 2 to 4 have a spherical surface mirror $a$ which constitutes the utmost case of a lens-mirror. This mirror can naturally be replaced by a lens-mirror having the same front surface in the same position, provided that the rays of the odd-numbered orders coincide at all places.

The constructional form of the system illustrated by Figure 2 corresponds to the third case in Table I, in which $\alpha$ is 0.5568 and $\beta+0.0032$, the lens $b$ being curved at the side facing the mirror $a$ and plane at the other. The lens $b$ can be bounded by the plane surface at any desired distance from the lens vertex, because this plane does not make any influence bear upon the path of the rays.

Figure 3 illustrates the second case in Table II, in which $\alpha$ is 0.5326 and $\beta-0.0026$. The lens $b$ is in this case plane at the side facing the lens-mirror $a$ and curved at the other, the thickness of the lens $b$ being $\nu=0.0151$.

Figure 4 shows an example having a meniscal lens $b$ whose side facing the concave mirror $a$ is spherical and has the radius 1.25. The smallest geometrical light path in the lens is 0.0090. The magnitudes $\alpha$, $\beta$ and $\nu_0$ are 0.5326, 0.0947 and 0.0167, respectively. The concave mirror has an angle of aperture $U=60°.66$.

I claim:

1. In an optical system for search-lights, corrected spherically for the rays proceeding from the axial point and comprising a concave lens-mirror of slight thickness and a lens, said lens-mirror being axially spaced from said lens and facing said lens with its concave side, said lens-mirror producing at least the principal convergence and having surfaces departing from sphericity at most slightly, at least one of the refractive surfaces of said lens departing considerably from sphericity, said lens being disposed near the centres of vertex curvature of the surfaces of said lens-mirror, a light source between said lens-mirror and said lens, the distance of said light source from the centre of curvature of the front surface of said lens-mirror being greater and the product of said distance and the cosine of half the angle of aperture of said lens-mirror being smaller than half the radius of curvature of the front surface of said lens-mirror.

2. In an optical system for search-lights, corrected spherically for the rays proceeding from the axial point and comprising a concave lens-mirror of slight thickness and a lens, said lens-mirror being axially spaced from said lens and facing said lens with its concave side, said lens-mirror producing at least the principal convergence and having surfaces departing from sphericity at most slightly, at least one of the refractive surfaces of said lens departing considerably from sphericity, said lens being disposed near the centres of vertex curvature of the surfaces of said lens-mirror, a light source between said lens-mirror and said lens, the distance of said light source from the centre of curvature of the front surface of said lens-mirror being greater and the product of said distance and the cosine of half the angle of aperture of said lens-mirror being smaller than half the radius of curvature of the front surface of said lens-mirror having at least one zone for causing a coincidence of the emergent rays of the third order and the rays of an odd-numbered order near the third order.

3. In an optical system for search-lights, corrected spherically for the rays proceeding from the axial point and comprising a concave lens-mirror of slight thickness and a lens, said lens-mirror being axially spaced from said lens and facing said lens with its concave side, said lens-mirror producing at least the principal convergence and having surfaces departing from sphericity at most slightly, at least one of the refractive surfaces of said lens departing considerably from sphericity, said lens being disposed near the centres of vertex curvature of the surfaces of said lens-mirror, a light source between said lens-mirror and said lens, the distance of said light source from the centre of curvature of the front surface of said lens-mirror being greater and the product of said distance and the cosine of half the angle of aperture of said lens-mirror being smaller than half the radius of curvature of the front surface of said lens-mirror, said lens having a marginal thickness departing at most slightly from the central thickness of said lens.

4. In an optical system for search-lights, corrected spherically for the rays proceeding from the axial point and comprising a concave lens-mirror of slight thickness and a lens, said lens-mirror being axially spaced from said lens and facing said lens with its concave side, said lens-mirror producing at least the principal convergence and having surfaces departing from sphericity at most slightly, at least one of the refractive surfaces of said lens departing considerably from sphericity, said lens being disposed near the centres of vertex curvature of the surfaces of said lens-mirror, a light source between said lens-mirror and said lens, the distance of said light source from the centre of curvature of the front surface of said lens-mirror being greater and the product of said distance and the cosine of half the angle of aperture of said lens-mirror being smaller than half the radius of curvature of the front surface of said lens-mirror, each of the surfaces of said lens being curved in one sense only.

5. In an optical system for search-lights, corrected spherically for the rays proceeding from the axial point and comprising a concave lens-mirror of slight thickness and a meniscal lens, said meniscal lens having a spherical convex surface, said lens-mirror being axially spaced from said lens and facing said lens with its concave side, said lens-mirror producing at least the principal convergence and having surfaces departing from sphericity at most slightly, at least one of the refractive surfaces of said lens departing considerably from sphericity, said lens being disposed near the centres of vertex curvature of the surfaces of said lens-mirror, a light source between said lens-mirror and said lens, the distance of said light source from the centre of curvature of the front surface of said lens-mirror being greater and the product of said distance and the cosine of half the angle of aperture of said lens-mirror being smaller than half the radius of curvature of the front surface of said lens-mirror.

RUDOLF STRAUBEL.